United States Patent [19]

Shapiro

[11] 4,328,925
[45] May 11, 1982

[54] HARD SURFACING FOR A CENTRIFUGE CONVEYOR

[75] Inventor: Leonard Shapiro, Upper Darby, Pa.

[73] Assignee: Pennwalt Corporation, Philadelphia, Pa.

[21] Appl. No.: 136,123

[22] Filed: Mar. 31, 1980

Related U.S. Application Data

[63] Continuation-in-part of Ser. No. 877,056, Feb. 13, 1978.

[51] Int. Cl.³ .............................................. B04B 3/04
[52] U.S. Cl. ......................................... 233/7; 416/224
[58] Field of Search ................... 233/7, 8, 9; 366/310, 366/312, 309, 311, 64, 67, 50; 198/673, 676, 677; 100/117, 145–150; 416/135, 218–224

[56] References Cited

U.S. PATENT DOCUMENTS

| | | | |
|---|---|---|---|
| 3,764,062 | 10/1973 | Brautigam | 233/7 |
| 3,937,317 | 2/1976 | Fleury | 198/676 |
| 4,006,855 | 2/1977 | Merzenich | 233/7 |

Primary Examiner—Robert W. Jenkins
Attorney, Agent, or Firm—Edward A. Sager

[57] ABSTRACT

A centrifuge conveyor is provided with improved hard surfacing wherein unitary subassemblies of backing tiles and wear-resistant members are welded by the backing tile to the conveyor. A subassembly is made unitary by the interengagement of the wear-resistant member to an undercut groove in the backing tile and by bonding with a heat reactive adhesive or grout applied to the interengaging parts. Each fragile wear-resistant member is braced against deflection at its outer portion through its backing tile to the conveyor. The preferred embodiment employs a plurality of wear-resistant members per backing tile, each such member being accurately pressed to its intricate, interlocking shape from sintered tungsten carbide.

18 Claims, 10 Drawing Figures

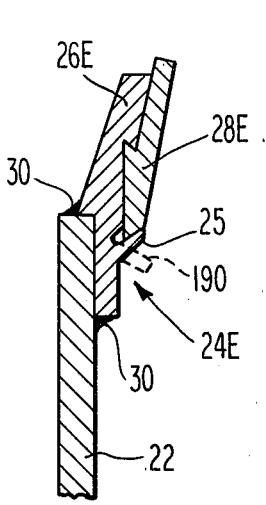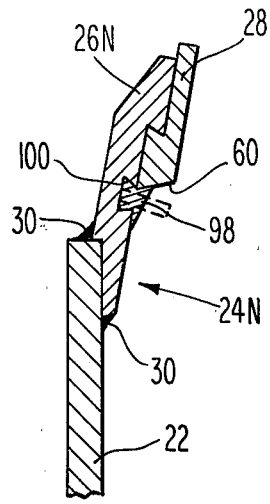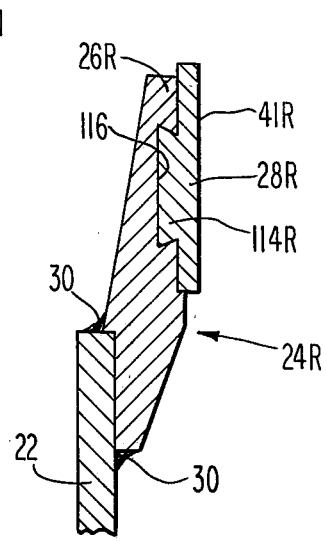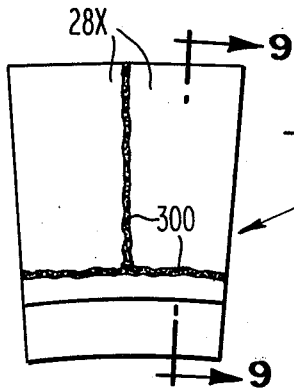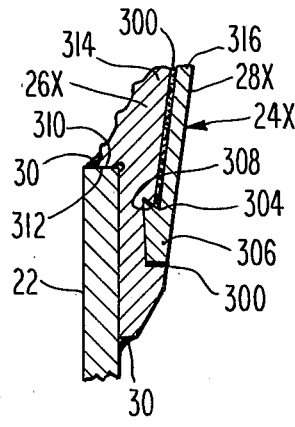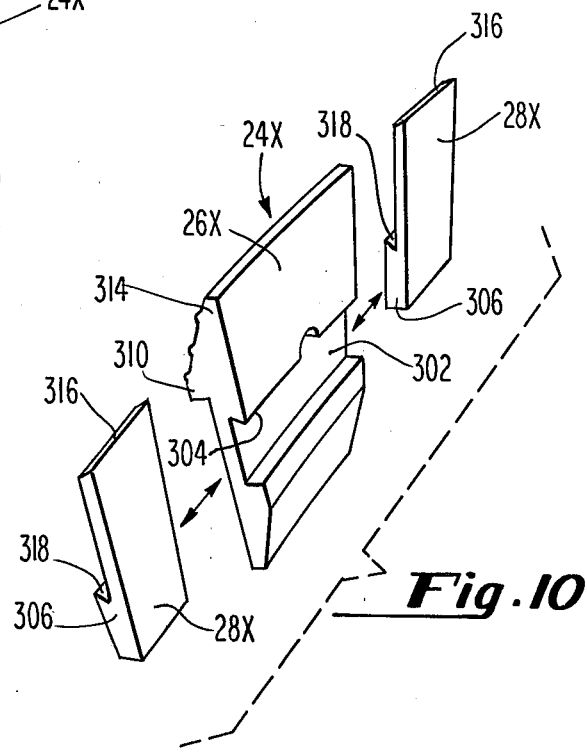

HARD SURFACING FOR A CENTRIFUGE CONVEYOR

BACKGROUND

This application is a continuation-in-part of U.S. application Ser. No. 877,056, filed Feb. 13, 1978, in the name of the same inventor.

The present invention relates to centrifuges for separating solid-liquid mixtures, such centrifuges including a rotatable bowl and an abrasion-resistant screw conveyor within the bowl, rotatable on a common axis. More particularly, the present invention is directed to providing improved hard surfacing for for the distal surfaces of the conveyor.

PRIOR ART

The present invention is an improvement upon the teachings of Frank C. Brautigam in U.S. Pat. No. 3,764,062, granted Oct. 9, 1973, assigned to the assignee of the present application, and Konrad Merzenich in U.S. Pat. No. 4,006,855, granted Feb. 8, 1977.

The Brautigam patent discloses a decanter centrifuge of the type to which the present invention is applied, and wherein hard surfacing is provided by a series of assemblies secured to the distal surfaces of the metal screw conveyor. Each assembly includes a preformed backing tile made of a metal which is weldable to the conveyor, and a preformed wear-resistant member bonded to the backing tile. The assembly is secured to the conveyor by welding the backing tile to the conveyor flight.

The Merzenich patent discloses a spirally shaped carrier vane having a mounting piece secured to the face of the vane, and a wear plate secured to the mounting piece by securing means. The securing means includes a removable locking element between a first wear surface on the wear plate and a second wear surface on either the carrier vane or the mounting piece. Although the Merzenich patent shows a construction in which the wear plate interengages the mounting piece, these parts are not subassembled before being attached to the carrier vane by inserts.

As will become apparent, the present invention seeks to combine a strong mechanical interlock between the backing tile and the wear-resistant member with the known structural advantage of welding the backing tile to the conveyor. Unlike Brautigam wherein the member and tile are bonded but not interengaged, however, the wear-resistant members and backing tiles of the present construction are interengaged when subassembled.

Among the differences between Merzenich and the present invention, interengagement of the wear plate with the mounting piece is not effected prior to mounting the wear plate on the conveyor. The present invention also differs from Merzenich in that the tip of the fragile wear-resistant member is braced against axial deflection through the backing tile by the conveyor.

SUMMARY OF THE INVENTION

According to the present invention, improved hard surfacing is provided wherein subassemblies of backing tiles and wear-resistant members are initially subassembled, prior to welding to the conveyor, by the interengagement or interlocking of each wear-resistant member to its associated backing tile. The backing tile is provided with an undercut groove which receives a dovetail or other male formation on the wear-resistant member, whereby the member is held against movement in radial direction. A suitable adhesive or grout is preferably applied to the interengaging parts and also between the broad, mutually facing surfaces of the backing tile and the wear-resistant member, thus providing a joint of high manufacturing and structural quality at the point of interengagement, and also for effective transfer of pressure between the broad surfaces of the two parts. Thus, dissimilar materials may be used in one subassembled part to achieve improved strength, durability and manufacturing efficiency at satisfactory cost.

In addition, by having the backing tile extend radially between the conveyor and the wear-resistant member, well beyond the distal surface of the conveyor, the distal tip portion of the wear-resistant member is braced against axial deflection. This reduces the chances that this fragile part of tungsten carbide will be fractured if it strikes a large, hard object in the solids moved by the conveyor.

The construction of the present invention lends itself well to precision manufacture, i.e. the backing tile may be an investment casting and the wear-resistant member may be formed in a powder metal press.

DRAWINGS

In the Drawings:

FIGS. 4–7 are views similar to FIG. 3, each showing a different modification of the construction shown in FIG. 3;

FIGS. 8–10 are views of the preferred embodiment of the present invention, wherein FIG. 8 is an elevational view of a subassembly, FIG. 9 is a sectional view taken along line 9—9 of FIG. 8 (and is similar to FIG. 3), and FIG. 10 is an exploded prospective view of the parts in FIG. 8.

DETAILED DESCRIPTION

Figure 1:
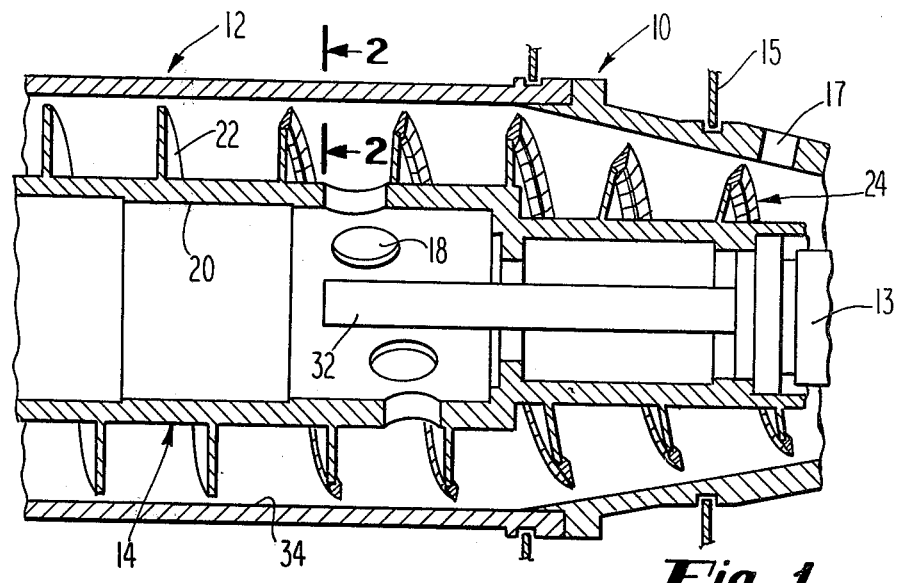
FIG. 1 is a fragmentary, longitudinal sectional view of a centrifuge embodying the invention.

A centrifuge embodying the invention is illustrated in vertical section in FIG. 1, and is designated generally 10. The centrifuge includes a rotatable bowl 12 with a screw conveyor designated generally 14 therewithin, with the screw conveyor rotatable on a common axis with the bowl. During operation the bowl and conveyor are rotated at slightly different speeds by motor and gear means, which have been substantially broken away and are denoted 13. Bowl 12 rotates on bearings within a housing 15 (which has been largely broken away in FIG. 1), is of frusto-cylindrical configuration and includes a solids discharge port 17 in the frustum end thereof. Conveyor 14 includes a generally central hub 20 with a helical flight 22 extending radially therefrom. Mounted at the distal edges of flight 22 are a plurality of preferably abutting, and in any case at least closely spaced, abrasion-resistant surface assemblies designated generally 24; relationship of these assemblies 24 to conveyor flight 22 is shown in FIG. 2.

During operation, an input slurry is introduced to the centrifuge through a feed tube 32 and passes through inlet port 18 in hub 20 into space between bowl 12 and conveyor 14. As the bowl and conveyor rotate, centrifugal forces cause the heavier, more dense solids to move radially outwardly with respect to the conveyor, to positions proximate the bowl interior surface 34. The conveyor, rotating at a slightly different speed than the bowl, moves the separated solids towards solids discharge port 17. Separated liquid moves to a liquid discharge port, not shown.

Figure 2:
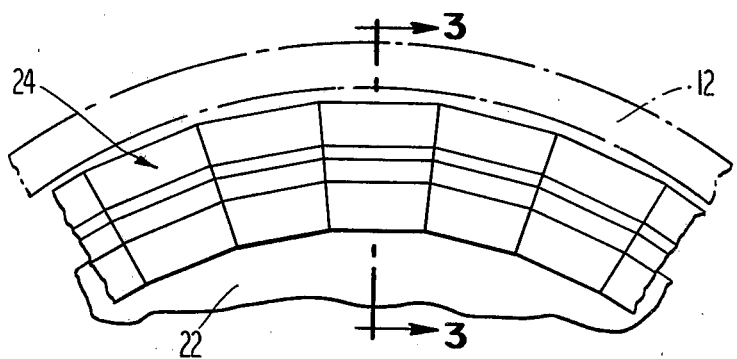
FIG. 2 is an enlarged view of a portion of a centrifuge conveyor, looking in the direction of the arrows 2—2 of FIG. 1.

Referring to FIG. 2, abrasion-resistant surface assemblies 24 are mounted at the distal outer edge of helical flight 22 of the conveyor and prolong conveyor life by retarding wear of the conveyor outer edge. A plurality of assemblies 24 are mounted, preferably in abutting relationship, to present a preferably substantially continuous helical surface at the conveyor outer edge, to convey solids towards the solids discharge port and to resist abrasive wear due to the erosive character of the solids. Each abrasion-resistant surface assembly 24 is secured together mechanically and preferably is thereafter secured to the conveyor outer edge; mechanical fastening means minimize residual stresses in the abrasion-resistant material assemblies and insulate the abrasion-resistant material in the assemblies from dynamic stresses and strains which occur to the conveyor during centrifuge operation.

Figure 3:
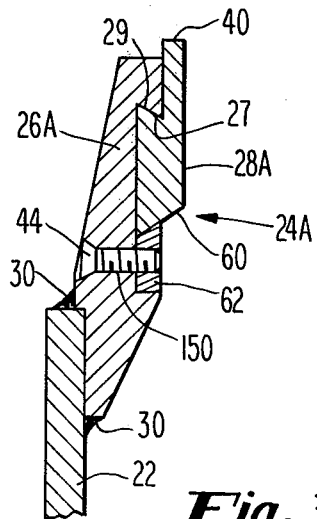
FIG. 3 is a sectional view taken along line 3—3 of FIG. 2.

FIG. 3 illustrates an embodiment of an abrasion-resistant surface assembly designated generally 24A and secured at a distal edge of a conveyor flight 22. The mechanical connection means for securing shock-absorbing backing tile 26A and abrasion-resistant member 28A together includes a wedge plate 62 secured in place by one or more screws 44 passing through passageway 150 in backing tile 26A and threadably engaging corresponding tapped holes in wedge plate 62. Backing tile 26A is secured to the distal edge of helical flight 22, preferably by weldments 30. Wedge plate 62 abuts canted lower surface 60 of abrasion-resistant member 28A. As screw 44 is tightened, it urges wedge plate 62 to the left as viewed in FIG. 3; due to the canting of surface 60 and of the unnumbered surface of the wedge plate which slidably contacts surface 60, leftward movement of wedge plate 62 urges abrasion-resistant member 28A radially outward with respect to the conveyor hub (upwards as viewed in FIG. 3) with complementary mating surfaces 27 and 29 thus being forced into engagement. Screw 44 serves as means for mechanically securing the wedge plate urging means to the shock-absorbing backing tile. The distal edge of member 28A is designated 40.

The abrasion-resistant member 24A is separated and therefore shock and vibration isolated from the conveyor flight by a backing tile. (For additional shock-isolation of abrasion-resistant member 28A from the conveyor flight, shock-absorbing grout, which acts as a filler, is preferably provided between the abrasion-resistant member and the backing tile. Grout fills voids which exist between the mating surfaces of the abrasion-resistant member and the backing tile; such voids necessarily exist since it is not economical under present technology to machine a perfectly flat surface. Suitable grouts include pastes, lead foils, etc. The grout is not an indispensable portion of the invention but use of grout is desirable since the grout further enhances the reliability of centrifuges embodying the invention by providing additional shock-isolation of the abrasion-resistant members from the conveyor flight. Unless otherwise stated hereinbelow, in each embodiment use of grout between the abrasion-resistant member and the shock-absorbing backing tile is understood.)

Interlocking or interengaging complementary mating surfaces 27 and 29, of tile 26A and abrasion-resistant member 28A respectively, prevent radially outward movement of abrasion-resistant member 28A with respect to conveyor flight 22 during centrifuge operation.

Figure 4:
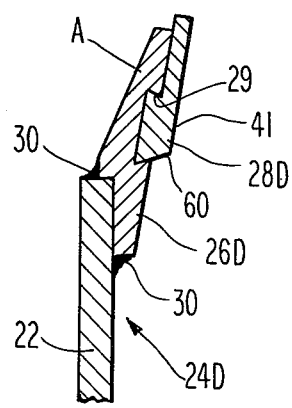

FIG. 4 illustrates another embodiment of the invention having an abrasion-resistant surface assembly 24D, backing tile 26D, and abrasion-resistant member 28D. A dovetail groove is cut into the backing tile 26D and a complementarily configured dovetail portion of abrasion-resistant member 28D slidably resident therein. Shock-absorbing backing tile 26D is secured to conveyor flight 22, preferably by weldments 30. The vertex forming the more radially outboard portion of the dovetail groove is denoted A in FIG. 4. These complementary mating surfaces of the abrasion-resistant member and the backing tile effectively prevent movement of the abrasion-resistant member radially outward with respect to the conveyor hub. Canted lower surface 60 of abrasion-resistant member 28D diverges from angularly disposed complementary mating surface 29 of the abrasion-resistant member, as one proceeds axially away from the solids displacing surface 41. Similarly, the lower shoulder formed in the backing tile 26D, which, as viewed in FIG. 4, forms the lower portion of the dovetail groove, is configured to complementarily receive surface 60 when the abrasion-resistant member is slidably inserted into the backing tile. This configuration prevents the abrasion-resistant member from moving, with respect to the backing tile, radially inwardly towards the conveyor hub. Assembly of the dovetail portion of abrasion-resistant member 28D into the dovetail groove portion of shock-absorbing backing tile 26D is preferably performed before backing tile 26D is welded to the conveyor helical flight.

FIG. 5 illustrates another embodiment of an abrasion-resistant surface assembly designated generally 24E wherein the tile 26E and abrasion-resistant member 28E together is provided by a deformable portion 25, extending from backing tile 26E, which portion is bent against abrasion-resistant member 28E during assembly to urge the abrasion-resistant member radially outwardly from respect to the conveyor hub and thereby retain the complementary mating surfaces (which are not numbered in FIG. 5) of abrasion-resistant member 28E and backing tile 26E in tight contact. The backing tile is undercut, as shown at 190, to make portion 25 more deformable. Backing tile 26E is again secured to conveyor helical flight 22, preferably by weldments 30. The abrasion-resistant surface assembly is depicted in the assembled condition in FIG. 5, with deformable portion 25 bent into place against abrasion-resistant member 28E. The position of deformable portion 25 before bending is shown in dotted lines.

FIG. 6 illustrates another embodiment of the invention including an abrasion-resistant surface assembly 24N. A mechanical connection means between shock-absorbing backing tile 26N and abrasion-resistant member 28N is provided by a soft wire 98 swaged into a dovetail groove 100 formed in the backing tile, with the soft wire 98 abutting the canted lower surface 60 of member 28N. As wire 98 is swaged into place against surface 60, member 28N is forced radially outward with respect to the conveyor hub (upward as viewed in FIG. 6) until complementary mating surfaces of the abrasion-resistant member and the backing tile (which have not been numbered) are engaged. Engagement of these surfaces prevents further radially outward movement of the abrasion-resistant member with respect to the backing tile as the centrifuge conveyor rotates. The backing tile 26N is preferably secured to conveyor helical flight 22 via weldments 30. In this embodiment, the soft wire has at least a portion which is deformable and bent against either the tile or the abrasion-resistant member or both the tile and the abrasion-resistant member, to retain the wire in place. The soft wire acts as a means for urging the unnumbered complementary mating surfaces into engagement and contacts both the tile and the abrasion-resistant member. As a variation, the soft wire urging means may be mechanically secured to either the tile or the abrasion-resistant member. One preferred configuration of wire 98 before it is deformed is shown in dotted lines.

FIG. 7 illustrates another embodiment of the invention including an abrasion-resistant surface assembly 24R. A mechanical connection means for securing shock-absorbing backing tile 26R and abrasion-resistant member 28R together is formed by a protruding dovetail portion 114R of member 28R, which extends from a central area of abrasion-resistant member 28R in a direction away from radially extending solids displacing surface 41R. This dovetail-shaped extension fits into a dovetail groove 116 formed in tile 26R. The tile 26R is preferably secured to conveyor helical flight 22 via weldments 30.

The metal of the conveyor flight 22 is preferably stainless steel, for example, type 316. The backing tiles discussed herein are weldable to conveyor flights made of this material.

THE PREFERRED EMBODIMENT

As shown in FIGS. 8 to 10, the preferred form of the invention provides improved hard surfacing for the helically formed, metal screw conveyor 14 of the centrifuge 10. The assemblies 24X of this embodiment each include a backing member or tile 26X, which is weldable to the conveyor flights 22, and a pair of tungsten carbide wear-resistant members 28X (also called abrasion-resistant members herein). The members 28X are subassembled to their respective backing tiles 26X and bonded together with a heat reactive grout or adhesive 300 prior to being mounted on the conveyor, as will be explained.

Each backing tile 26X is preferably made from a high molybdenum, corrosion resistant material such as Hastelloy, a product of the Stellite Division of Cabot Corporation. Although a backing tile 26X may be machined, it is ideally made as a precision investment casting, a process which accurately produces intricate shapes. A groove or female formation 302 formed in the axially facing surface of the tile 26X, which is undercut along its upper edge 304, is an example of a shape which may be accurately formed by investment casting.

It is a feature of the present invention that the female formations 302 of the backing tile 26X interengage the male formations 306 of the wear-resistant member 28X along a surface 308 at the undercut edge 304 of the groove, thereby positively and securely holding the member 28X against radial movement. This construction also holds the member 28X against tilting motion about undercut edge 304.

When assembled and in use the groove 302 extends about the rotational axis of the conveyor 14, generally following the helical form of the conveyor flights 22 on which the hard surfacing is mounted. When the hard surfacing is in place, neighboring wear-resistant members 28X abut at their side edges and thus augment the adhesive 300 in keeping the members 28X assembled to the backing tiles 26X.

As best seen in FIG. 9, the wear-resistant member 28X extends in radial direction substantially beyond the distal edge 310 of the conveyor 14. Provision is also made to brace the cantilevered portion of this fragile member, in order to prevent its fracture in the event of forceful contact with any large, heavy object. Such provision is effected by providing the backing tile or member 26X with a shoulder 312 and a tapered tip 314. The shoulder 312 rests on the distal edge 310 of the conveyor flight 22, thereby providing accurate location and firm support on the conveyor. The backing tile 26X extends between the conveyor flight 22 and the wear-resistant member 28X in radial direction substantially beyond the distal edge 310 of the conveyor and then tapers toward the distal edge 316 of member 28X. As shown, the distance that member extends beyond the backing tile 26X is less than the thickness of the tile 26X. By this arrangement, the member 28X is braced through the backing tile 26X by the conveyor flight 22 against axial deflection in the direction of the conveyor flight 22.

By employing a pair or a plurality of wear-resistant members 28X in each assembly 24X, these parts are now so narrow that they are within the mold height of a powder metal compacting press. The members 28X are preferably formed from powdered metal or ceramic, preferably sintered tungsten carbide. To do so, the beveled edge 318 of the member 28X is formed by placing the forming surface therefor parallel to the direction of die travel.

The backing tiles and the wear-resistant members made as described above are dimensionally accurate and, therefore, a hard surfacing assembly of high quality is produced. When mounted on a conveyor the hard surfacing so made presents a better appearance than many previous hard surfacing techniques, and the likelihood of flow disturbances due to surface irregularities is minimized.

The adhesive material used for producing a grouted joint 300 by filling the space between mutually facing surfaces may be fine mortar, cement, or ceramic material, but epoxy material is preferred. Armstrong A-701 epoxy material, which is corrosion resistant and heat reactive at 350° to 400° F., is a commercially available adhesive satisfactory for this purpose.

The means for securing a backing tile and abrasion-resistant member together is sometimes provided by adhesive disposed between at least a portion of tile and a portion of abrasion-resistant member. The adhesive may be shown as a layer, but the adhesive need not be a layer which completely separates the backing tile from the abrasion-resistant member. The backing tile is secured to the conveyor helical flight 22, preferably by welds 30. Suitable adhesives include those members of the epoxy family which are resistant to high temperaturs and also to corrosive materials in feed delivered for separation to centrifuges.

Variations and combinations, including reversals of parts from those shown, and other modifications fall within the scope of this invention. Furthermore, as in the case of the preferred embodiment, it is not necessary that the abrasion-resistant members and the shock-absorbing backing tiles be matched on a one-to-one basis. Several abrasion-resistant members may be mounted on a single shock-absorbing backing tile, if desired. The above particular description is by way of illustration and not of limitation. Changes, omissions, additions, substitutions, and/or modifications may be made without departing from the spirit of the invention.

What is claimed is:

1. Improved hard surfacing for a helically formed, metal screw conveyor of a centrifuge, said conveyor extending in radial direction along a line between its rotational axis and its distal surface, said conveyor being rotatable transverse to said radial line about said axis, comprising:
   a. a preformed backing member made of a metal which is weldable to said conveyor,
   b. a preformed wear-resistant member,
   c. means securing at least one wear-resistant member to said backing member to provide a unitary subassembly which is subsequently mounted on the conveyor, with male and female formations on the respective members interengaging at a surface between them which, in use, extends along a helical line about said axis generally following the distal edge of said conveyor, said formations holding said wear-resistant member against movement in radial direction,
   d. said wear-resistant member having a distal portion extending in radial direction substantially beyond the distal surface of said conveyor,
   e. said backing member being welded to said conveyor, with said backing member extending between said conveyor and said wear-resistant member in radial direction substantially beyond the distal surface of said conveyor, the distal portion of said wear-resistant member being braced by said conveyor through said backing member against deflection in axial direction toward said conveyor.

2. Hard surfacing according to claim 1 wherein said female formations are defined by a groove formed in an axially facing surface portion of said backing member, the outer edge of said groove being undercut for receiving said male formations.

3. Hard surfacing according to claim 2 wherein said formations further include engaging surfaces on the respective members holding said wear-resistant member against tilting movement about said undercut edge.

4. Hard surfacing according to claim 1 further including grout between mutually facing, spaced surfaces of said members.

5. Hard surfacing according to claim 1 wherein the means securing the wear-resistant member to said backing member includes an adhesive material.

6. Hard surfacing according to claim 5 wherein said adhesive material is heat reactive to form an adhesive bond between said members.

7. Hard surfacing according to claim 1 wherein said wear-resistant members are made of sintered tungsten carbide.

8. Hard surfacing according to claim 1 wherein said conveyor and said backing tile are each made of a ductile material.

9. Hard surfacing according to claim 1 wherein said male formations are of dovetail configuration.

10. Hard surfacing according to claim 1 wherein said backing member has a shoulder resting on the distal edge of said conveyor, and wherein said backing member tapers from said shoulder to its distal edge, said wear-resistant member extending outwardly beyond said backing member a distance that is less than the thickness of said backing member at its distal edge.

11. Hard surfacing according to claim 1 wherein a plurality of wear-resistant members are bonded to each backing member.

12. Hard surfacing according to claim 1 wherein said female formations are defined by a groove formed in an axially facing surface portion of said backing member, the outer edge of said groove being undercut to receive said male formations, there being a plurality of wear-resistant members subassembled to each backing member, said wear-resistant member being made of sintered tungsten carbide, said conveyor and said backing member being made of a ductile material, the means securing the wear-resistant members and the backing member including an adhesive epoxy material, said backing member having a shoulder portion resting on the distal edge of said conveyor.

13. Hard surface according to claim 1 wherein said backing member and said wear-resistant member have comlementary mating surfaces configured for resisting radially outward movement of said wear-resistant member with respect to said backing member; and further including mechanical connection means, contacting said wear-resistant member and said backing member, remote from said mating surfaces, for biasing said wear-resistant member and said backing member into engagement.

14. Hard surfacing according to claim 13 wherein said biasing means is disposed between a portion of said wear-resistant member and a portion of said backing member.

15. Hard surfacing according to claim 13 wherein said biasing means has a deformable portion, bent against said wear-resistant member, retaining said biasing means in contact with said wear-resistant member and said backing member.

16. Hard surfacing according to claim 13 further comprising means for mechanically securing said biasing means to said backing member.

17. Hard surfacing according to claim 1 wherein said backing member and said wear-resistant member have complementary mating surfaces configured to resist radially outward movement of said wear-resistant member with respect to said backing member and wherein said backing member includes a deformable portion, bent against said wear-resistant member, holding said complementary mating surfaces of said wear-resistant member and said backing member in engagement.

18. Hard surfacing according to claim 1 wherein said male and female formations are of dovetail configuration, said wear-resistant member having a portion thereof extending distally from said male formation.

* * * * *